Patented July 5, 1938

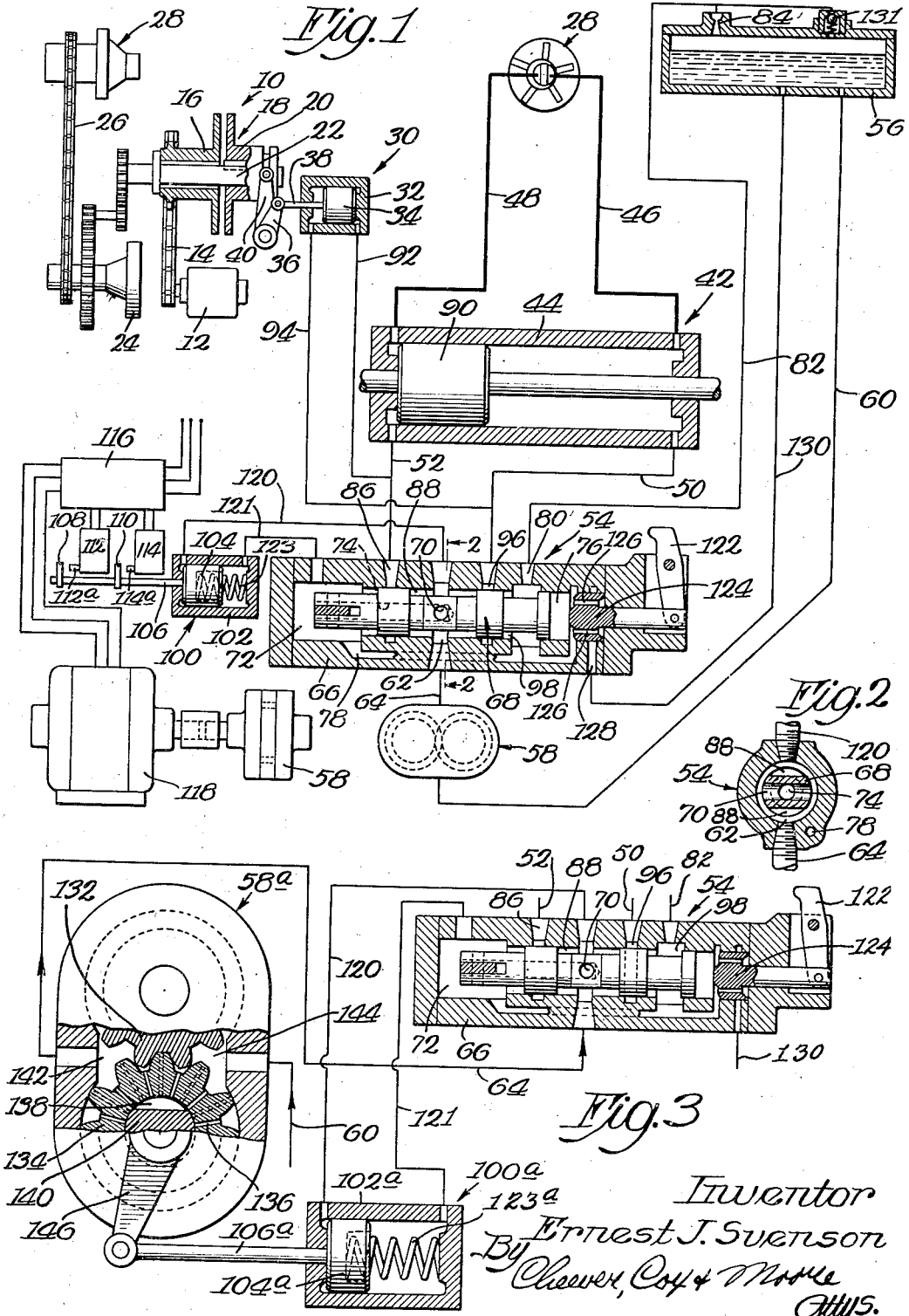

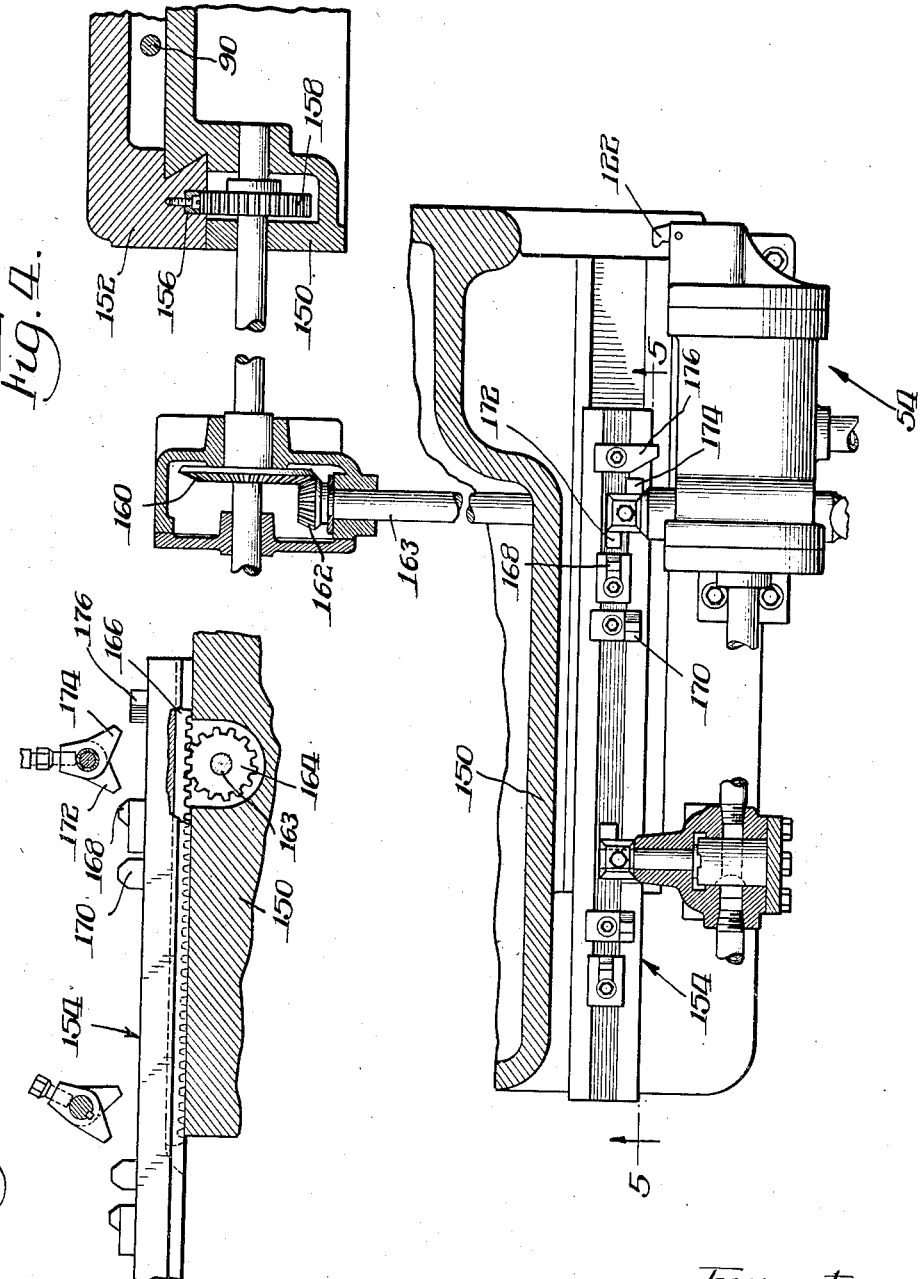

2,122,443

UNITED STATES PATENT OFFICE 2,122,443

HYDRAULIC ACTUATOR SYSTEM

Ernest J. Svenson, Rockford, Ill.

Application July 25, 1931, Serial No. 553,115

21 Claims. (Cl. 60—52)

My invention relates generally to improvements in hydraulic systems of control, and particularly to improvements in systems whereby the speed of travel of a hydraulic actuator may be effectively controlled.

It has been the common practice, in designing machines for propelling machine tools and the like, to provide means for moving said tools at various speeds. My present invention relates particularly to hydraulic devices for propelling machine tools and the like. Fluid pumps, such as high displacement gear pumps, are in some instances employed to effect the rapid movement or traverse of a hydraulic actuator piston which is coupled with a machine tool carriage. These pumps are sometimes continuously driven at a constant maximum rate, and experience has shown that, as a result of this continuous operation, the fluid in the system becomes heated. Some of the conventional fluid types of circuits with which I am familiar are so arranged that the rapid traverse pump must continuously function at nearly its maximum rate in order to take care of leakage within high pressure pumps which are associated with said circuits for the purpose of supplying fluid under relatively high pressure to the actuator piston.

It is one of the primary objects of my present invention to avoid the above mentioned temperature rise in the fluid medium by coupling a rapid traverse fluid pump with a circuit containing an actuator cylinder and piston, in such a manner that the pump displacement may be varied in accordance with the requirements of the circuit. To this end I propose to provide means whereby the displacement of the rapid traverse pump may be maintained at a minimum when the circuit conditions are such as not to require a greater displacement, and whereby the displacement of the pump may be manually or automatically increased when the circuit conditions are such as to require it.

Another object of my invention is to provide, in combination with a circuit employing a high pressure pump for feeding purposes and a lower pressure pump for rapid traverse purposes, means whereby the displacement of the rapid traverse pump may be varied from a predetermined minimum to a predetermined maximum in accordance with the operating requirements of the circuit, which includes both of said pumps.

Still another object is to provide, in combination with circuits of the type in which one of the above mentioned pumps may operate for propelling purposes independently of the other, means for causing the rapid traverse pump to operate at a minimum displacement during the operative functioning of the high pressure pump and to operate at increased displacement when the circuit is to be conditioned for rapid traverse purposes.

More specifically, my invention contemplates the provision of means which may be operated manually or which may be operated in response to the actuation of a machine element propelled by an actuator piston, to thereby effect a variation in displacement of the rapid traverse pump either by varying the speed thereof or by controlling the passage of fluid therethrough without affecting the rotative speed of the pump.

Still another object of my invention is to provide a control means for rapid traverse pumps, as above set forth, which will function in response to pressure conditions within the fluid circuit coupled therewith.

The foregoing and numerous other objects and advantages will be more apparent from the following detailed description when considered in connection with the accompanying drawings, wherein—

Figure 1 is a diagrammatic representation of a fluid circuit which is arranged in accordance with the teachings of my present invention;

Figure 2 is a transverse sectional view of the main control valve, said view being taken substantially along the line 2—2 of Figure 1;

Figure 3 is a fragmentary diagrammatic representation of a modified fluid circuit to disclose the manner in which the displacement of the rapid traverse pump may be varied without affecting the speed thereof;

Figure 4 is a fragmentary sectional view disclosing the operative connection between the main control valve and the hydraulic actuator; and Figure 5 is a transverse sectional view taken longitudinally of the dog carrying slide, said view being taken substantially along the line 5—5 of Figure 4.

Referring to the drawings more in detail wherein like numerals have been employed to designate similar parts throughout the various figures, it will be seen that for the purpose of illustrating one practical embodiment of the invention, I have disclosed in a somewhat schematic manner certain elements of a material working apparatus, such as a lathe of the type disclosed in my copending application, Serial No. 481,742, filed September 13, 1930, which has since matured into Patent No. 2,078,696, and I have indicated these elements generally by the numeral 10, Figure 1. These elements include a suitable source of power supply, such as an electric motor 12, which is coupled through the medium of a chain 14 with an element 16 of a clutch mechanism 18. A companion clutch member 20 is keyed to a shaft 22 and is adapted to shift toward and away from the member 16. When the clutch member 20 is operatively associated with the member 16, power is transmitted to the shaft 22, and this shaft is coupled by suitable gearing with a spindle 24. This spindle 24 may be of any conventional type for supporting a work piece or cutter and is coupled by means of a chain 26 with a high pressure plunger pump 28. Thus, when the drive shaft 22 is rotated, the spindle 24 and high pressure plunger pump 28 also function.

To control the shifting of the clutch member 20 I provide a fluid operated mechanism 30, which includes a cylinder 32 and a piston 34 therein. One end of the piston 34 is coupled with an arm 36 through the agency of a piston rod 38, and this arm is connected with a yoke 40, which serves as the actuating means for the clutch member 20. When the piston 34 occupies the position shown in Figure 1, the clutch members 16 and 20 are disengaged, and when the piston is shifted to the left, these members operatively engage each other. The shifting of the clutch actuator piston 34 is controlled by the fluid in a circuit about to be described.

This circuit includes the plunger pump 28 and a hydraulic actuator 42 including a cylinder 44, the opposite ends of which are connected by means of pipe lines 46 and 48 with the intake and discharge sides of the plunger pump 28. In the disclosed embodiment the pipe line 46 connects the intake side of the pump 28 with the right side of the cylinder 44, and the pipe line 48 connects the discharge side of the pump with the left end of the actuator cylinder. Opposite extremities of the cylinder 44 are also connected by pipe lines 50 and 52 with a valve designated generally by the numeral 54. This valve is similar to the valve disclosed in my above mentioned co-pending application, now Patent No. 2,078,696, and therefore a detailed disclosure thereof is not essential to a full understanding of my present invention.

A suitable fluid reservoir 56 is provided which communicates with the intake side of a gear pump 58 through the agency of a pipe line 60, and fluid from the discharge side of the pump 58 communicates with the intake port 62 of the valve 54 by means of a pipe line 64, Figure 1. The valve 54 includes a cylindrical casing 66 and a valve member 68 reciprocable therein. When the valve member 68 occupies the position shown in Figure 1, fluid from the discharge side of the high displacement low pressure gear pump 58 is directed through the intake port 62 of the valve, and from this point passes through a radial port 70, which communicates with an end chamber 72 of the valve through a longitudinal passage 74 in the valve member 68. This chamber 72 communicates with an oppositely disposed end chamber 76 through a passageway 78 provided in the casing 66, thereby maintaining the valve member 68 substantially in balance. That is to say, the fluid pressure at the opposite extremities of the valve member acts with substantially equal force, thereby preventing the inadvertent shifting of said valve member. Fluid from the passageway 78 also communicates with a valve port 80 which connects with a pipe line 82. This pipe line communicates with a restricted orifice 84 provided at the upper portion of the reservoir 56. By means of this fixed restricted orifice a predetermined back pressure is set up within the fluid to maintain the desired fluid pressure within the system.

Assume that the valve member 68 is suddenly shifted to the left, either manually or automatically. This will establish communication between the intake port 62 of the valve and port 86 through a lateral passage 88 provided in the valve member 68. The radial ports 70 will be closed, thereby preventing fluid under low pressure from the gear pump to enter the end chamber 72. This fluid passes outwardly through the valve port 86, through the pipe line 52, and enters the left end of the actuator cylinder 44, thereby causing an actuator piston 90 to be urged to the right. This piston 90 may be connected with any shiftable machine element such as a machine tool carriage or the like (not shown). Contemporaneously with the delivery of fluid to the left end of the cylinder 44, fluid under the same pressure is delivered to the right end of the cylinder 32 through a pipe line 92, thereby causing the piston 34 to be urged to the left so as to operatively engage the clutch member 20 with its companion member 16. Fluid from the opposite side of the cylinder 32 passes outwardly through a pipe line 94, which connects with the return pipe line 50. This pipe line 50 connects with a valve port 96 which at this instant communicates with the valve port 80 and the return pipe line 82 through the agency of a valve passage 98.

Attention is now directed to a hydraulic actuator designated generally by the numeral 100, which includes a cylinder 102 and an actuator piston 104 reciprocable therein. A piston rod 106 carries a pair of spaced dogs 108 and 110. Positioned in the line of travel of these dogs are companion pilot switches 112 and 114 respectively. These switches may be of any conventional design and are electrically coupled with a magnetic contactor 116, which is indicated diagrammatically in Figure 1. This magnetic contactor 116 connects with the external source of power supply on one side and with a two-speed motor 118 on the other side. When the valve member 68 occupies the position shown in Figure 1, the motor 118 operates at its slower speed say, for example, 450 R. P. M. This motor drives the gear pump 58. Thus when the pump 58 is not needed for rapid traverse purposes, that is, for the purpose of propelling the actuator piston 90 at a rapid rate, said pump operates at a relatively slow speed, thereby preventing increases in the temperature of the fluid medium which normally take place when conventional pumps are operated at a high speed over a considerable period of time. When the valve member 68 is shifted to the left in the manner described above, the increase in fluid pressure which occurs as a result of the delivery of said fluid to the left end of the cylinder 44 causes the actuator piston 104 to be shifted to the right. The cylinder 102 in which the piston 104 reciprocates is connected to the intake port 62 of the valve 54 by a line 120 and is connected with the end chamber 72 by a line 121. This causes the dogs 108 and 110 to depress buttons 112a and 114a of the pilot switches 112 and 114 respectively. One of these switches may be of the conventional normally open type and the other of the conventional normally closed type. Thus, by actuating these pilot switches, the magnetic contactor is energized so as to cause the speed of the motor 118 to be materially increased. This increase in speed causes a corresponding increase in the speed of the pump 58, thereby effecting increased fluid displacement to the left end of the cylinder 44. This causes the piston 90 to be urged at a rapid rate within the cylinder 44.

When the piston 90 has traveled at a rapid rate a predetermined distance to the right, the valve member 68 may be manually or automatically shifted to the neutral position shown in Figure 1. In this position the gear pump 58 is cut off from the cylinder 44, and the plunger pump 28 continues to function in a closed circuit containing the pipe lines 46 and 48 and the actuator 42 to propel the piston 90 at a feeding rate to the right. Instantaneously upon the shifting of the valve to this neutral position, the actuator piston 104 is shifted to the left. This will be apparent from the fact that the piston area acted upon at the right end of the piston 104 is greater than the area at the left due to the presence of the piston rod 106. Thus, immediately upon shifting the main control valve 68 to its neutral position, the piston 104 automatically shifts to the left, thereby causing the switches 112 and 114 to condition the magnetic contactor 116 so as to reduce the speed of the motor 118. The motor and consequently the gear pump 58 continue to operate at the low speed during the operative functioning of the high pressure pump 28.

In order to more clearly set forth the arrangement just described, we call attention to the fact that the discharge from the pump 58 when it is running at slow speed, flows through the following passages: The intake port 62, the radial ports 70 in the valve member 68, the longitudinal passage 74 in said valve member, the valve chamber 72, the passageway 78, valve passage 98, valve port 80, and pipe line 82, which connects with the restricted orifice 84. Under these conditions the restricted orifice 84 causes the required amount of back pressure to be built up within the system. However, with the pump 58 operating at slow speed, the volumetric delivery thereof through the pipe line 82 is accommodated by the restricted orifice 84 without necessitating the opening of the valve 131.

A coiled spring 123 may be interposed between the right end of the piston 104 and the inner surface of the cylinder wall, as clearly shown in Figure 1, if it is deemed necessary. For example, if the orifice 84 were such as not to restrict the flow of fluid sufficiently to build up any appreciable pressure in the valve chamber 72 during the idling of the pump 58, the spring 123 would serve to quickly and automatically effect the shifting of the piston 104 to the left when the valve 68 is moved to its neutral position. Obviously the pressure applied to the left end of the piston 104 when the valve 68 is shifted to the left or right, is sufficient to overcome the force of the spring 123.

As the piston 90 reaches the limit of its feeding stroke to the right, a lever 122 may be manually or automatically shifted so as to move a piston valve 124 to the left. The movement of this valve to the left immediately establishes communication between the right cylinder chamber 76 and the reservoir 56 through longitudinal passages 126, a valve port 128, and a pipe line 130. In this manner the pressure of the fluid through the chamber 76 is decreased due to the fact that said fluid may flow unrestrictedly back into the reservoir 56. This causes the unbalancing of the valve member 68 within the casing 66 and results in the sudden shifting of said valve member from its neutral position shown in Figure 1 to its extreme right position. In other words, by referring to Figures 1 and 3, it will be apparent that, upon movement of the valve 124 to the left, the end of passage 78 connected to the chamber 76 will be cut off at the same time that valve port 128 is opened. Thus the valve 68 will be moved to the right by the pressure of fluid, because the pressure in chamber 72 will be greater than in chamber 76. This is due to the fact that at this instant chamber 76 is out of communication with the passage 78 and in free communication with the reservoir 56 through passages 126 and conduit 130, the restriction at 84 causing a greater pressure in chamber 72. In this shifted position a reversal in fluid flow within the circuit takes place so that fluid from the pump 58 flows through the intake port 62 and then through the pipe line 50 into the right end of the cylinder 44, and fluid from the left end of said cylinder flows through the pipe line 52 and into the left valve chamber 72. Fluid pressure in the pipe line 94 causes the piston 34 to be shifted to the right, thereby arresting the rotation of the spindle 24 and the actuation of the high pressure pump 28. Contemporaneously with the shifting of the valve member 68, the piston 104 is again urged to the right so as to cause the motor 118 and consequently the gear pump 58 to increase in speed. In this manner the piston 90 is driven at rapid traverse to the left and the plunger pump 28 remains functionally inoperative. When the piston reaches its starting position, the valve 68 may be manually or automatically shifted to its neutral position, thereby causing the speed of the gear pump to be reduced and conditioning the circuit for a subsequent cycle of operation similar to that just described.

Attention is directed to a spring valve 131 which connects with the pipe 82, as clearly shown in Figure 1. This spring or relief valve is adapted to open when sufficient pressure is exerted thereon, and this pressure is established within the pipe line or channel 82 only during the operative functioning of the pump 58, or, in other words, only when the piston 90 is being shifted at a rapid rate. During the operative functioning of the plunger pump 28 the pressure within the channel or pipe line 82 is not sufficient to open the relief valve 131. In other words, I provide a low pressure circuit which is subjected to variation in pressures. Thus during the operative functioning of the gear pump 58 for propelling the piston 90 at a rapid rate, the pressure is greater than when this pump 58 idles and the plunger pump 28 is functionally operative. The relief valve 131 serves to take care of the increase in fluid displacement through the pipe line or channel 82 during the rapid movement of the piston 90. This valve 131 is so designed as to positively prevent leakage during the feeding cycle, and serves as an effective means for eliminating introduction of air in the fluid circuit during the feeding stroke of the piston.

In Figure 3 I have disclosed a modified arrangement whereby the displacement of a gear pump 58a may be varied without changing its speed of operation. The gear pump 58a disclosed in Figure 3 is similar to the variable displacement gear pump disclosed in my co-pending application, Serial No. 430,868, filed February 24, 1930, which has since matured into Patent No.

1,912,737, and hence a detailed description thereof is not necessary for a clear understanding of the present invention. This pump includes a pair of gears 132 and 134. The gear 134 is provided with radial ports or passages 136 which communicate at their inner extremities with a port 138 of an oscillatory valve member 140. When the valve member 140 occupies the position shown in Figure 3, the pump will be operating at its minimum degree of displacement, inasmuch as a portion of the fluid from the discharge chamber 142 is returned through the radial ports 136 and the valve port 138 to the intake chamber 144. However, if the valve member 140 is moved in a counter-clockwise direction so as to prevent any return flow of fluid from the discharge or high pressure side of the pump to the lower pressure or intake side, said pump will operate at its maximum displacement. The shifting of the valve 140 may be controlled by a hydraulic actuator 100a which corresponds with the hydraulic actuator shown in Figure 2. This actuator includes a cylinder 102a and a piston 104a reciprocable therein, which is connected by means of a piston rod 106a with an arm 146. This arm 146 is connected with the valve 140 as clearly shown in Figure 3. The actuator cylinder 102a is connected with the valve 54 in the same manner as the cylinder 102 is connected with said valve in Figure 1, namely, by the pipe lines 120 and 121. It will be apparent that when the main control valve 68 occupies the neutral position shown in Figures 1 and 3, the piston 104a will be maintained in the position shown in Figure 3 so as to position the valve 140 for minimum fluid displacement. It will also be apparent that when the valve member 68 is shifted to the left or to the right the piston 104a will be shifted to the right so as to condition the valve 140 for maximum displacement. It will be noted that a spring 123a, similar to the spring 123 of Figure 1, may be employed for urging the piston 104a to the left if such a structure is deemed necessary.

In Figures 4 and 5 I have illustrated the valve mechanism 54 mounted upon a fragmentary portion of a machine frame 150. A supporting member or slide 152 is coupled with the actuator 90, and the movement of the actuator and slide causes movement of a dog supporting slide 154 through the agency of suitable gearing. Thus, the slide acting through a rack 156, a gear 158, bevel gears 160 and 162, shaft 163, and a gear 164 which meshes with a rack 166 on the underside of the dog supporting slide 154, causes movement to be imparted to the latter. Dogs 168 and 170 cooperate with companion fingers 172 and 174 in causing the automatic shifting of the main valve 68 from central or neutral position to rapid approach position, etc. Another dog 176 is adapted to engage the lever 122 when the actuator piston 90 or the supporting member 152 actuated thereby reaches the limit of its advance movement. With the foregoing arrangement, any desired cycle of operation can be obtained.

From the foregoing it will be clear that my invention contemplates the provision of a very simple control arrangement for hydraulic circuits wherein it is desirable to actuate the high displacement pump or gear pump at a minimum speed when said pump is not being employed for rapid traverse purposes, and to automatically effect an increase in the speed of said pump when it is to be used for rapid traverse purposes. The two-speed motor referred to in the description may be of any conventional design, and, in fact, all of the electrical equipment necessary to control the variation in speed thereof may also be of well known design. By reducing the speed of the motor not only is power conserved, but the development of heat in the fluid medium, which has been experienced heretofore in operating conventional gear pumps at continuous maximum speed over an extended period of time, is materially reduced. This is of the utmost importance in connection with the operation of metal working machines in the shop, which must be used continuously through a working day and must sometimes be operated continuously for a much longer period. Under such conditions the controlling of the speed of the gear pump, as set forth in my present invention, enables machines to be operated continuously over an extended period of time without experiencing increase in temperature of the fluid medium to any appreciable extent. The modified arrangement disclosed in Figure 3 precludes the necessity of varying the speed of the pump and only requires the displacement thereof to be varied in accordance with the conditions in the fluid circuit. The improved type of gear pump disclosed in Figure 3 is particularly adapted for continuous high speed operation inasmuch as the provision of the radial ports and the valve cooperating therewith positively prevents fluid from being trapped between the meshing gear teeth, and also prevents fluid slippage from the high to the low pressure side of the pump during the functioning thereof at high speeds. For a more detailed description of the functional characteristics of said pump, reference is again made to my above mentioned co-pending application which has since matured into Patent No. 1,912,737.

In the foregoing description I have set forth that the gear pump is adapted to idle at its slower speed and to serve as a fluid propelling mechanism for driving the actuator piston 90 when the speed or displacement of the pump is increased. Obviously the invention is not limited to this construction inasmuch as the pump may serve in certain instances when it is operating at its slower speed as a fluid propelling mechanism for delivering fluid at a very low pressure to a shiftable part, such as an actuator piston, and when operating at its increased speed or increased displacement, to drive said actuator piston at an increased speed. In other words, my invention contemplates the provision of a hydraulic system of control wherein the low pressure fluid propelling means or gear pump may function at low displacement for propelling an actuator at a slower speed and at higher displacement for propelling said actuator at increased speed. This arrangement is particularly adapted for use in instances where a very slow movement is to be imparted to the tools of a machine during the setting up operation, and a rapid movement after the set-up has been completed. It will therefore be apparent that my invention has a very broad application in the machine tool and other arts where it is desirable to actuate machine elements and the like at various speeds from a single source of fluid supply, said speeds being automatically controlled in timed relation with the shifting of the machine parts.

Obviously other modifications and changes may be made for controlling the speed or variation in displacement of the gear pump without departing from the spirit of my present invention, said invention being limited only by the scope of the appended claims.

Having thus described my invention, what I claim as new and desire to secure by Letters Patent is:

1. A hydraulic actuator system including a hydraulic actuator for shifting machine parts and the like, a feed pump for imparting feeding movement to said actuator, a low pressure independently operable high displacement pumping mechanism adapted to deliver fluid at various rates for imparting rapid traverse to said actuator, a valve for controlling communication between said pumping mechanism and said actuator, driving means for said pumping mechanism, and means operable in timed relation with the actuation of said valve for controlling the rate of delivery of said pumping mechanism.

2. A hydraulic actuator system including a hydraulic actuator for shifting machine parts and the like, a feed pump for imparting feeding movement to said actuator, a low pressure independently operable high displacement pumping mechanism adapted to deliver fluid at various rates for imparting rapid traverse to said actuator, a valve for controlling communication between said pumping mechanism and said actuator, driving means for said pumping mechanism, and pressure actuated means operable in timed relation with the actuation of said valve for controlling the rate of delivery of said pumping mechanism.

3. A hydraulic actuator system including a hydraulic actuator for shifting machine parts and the like, a pumping mechanism adapted to deliver fluid at various rates for imparting rapid traverse to said actuator, a valve for controlling the fluid flow between said pumping mechanism and said actuator to govern the direction of travel thereof, driving means for said pumping mechanism, and means hydraulically coupled with said valve and operable in response to the pressure of said controlled fluid for controlling the rate of delivery of said pumping mechanism.

4. A hydraulic actuator system including a hydraulic actuator for shifting supporting parts and the like, a low pressure high displacement pumping mechanism adapted to deliver fluid at various rates and for imparting rapid traverse to said actuator at maximum delivery, a valve for controlling the fluid flow between said pumping mechanism and said actuator, driving means for said pumping mechanism, control means operable in accordance with a pressure condition within the valve to effect a decrease in fluid delivery, said pressure condition being caused by shifting said valve to a position in which it disconnects said pumping mechanism from said actuator, and a second pumping means adapted to deliver fluid to said actuator when said valve is positioned to disconnect said first pumping means from said actuator.

5. A hydraulic actuator system including a hydraulic actuator for shifting supporting parts and the like, a low pressure high displacement pumping mechanism adapted to deliver fluid at various rates for imparting rapid traverse to said actuator at maximum delivery, a valve for controlling the fluid flow between said pumping mechanism and said actuator, driving means for said pumping mechanism, control means for said pumping mechanism operable when the valve establishes the fluid flow between said pumping mechanism and said hydraulic actuator to effect an increase in displacement of said pumping mechanism and operable in accordance with a pressure condition of said controlled fluid to effect a decrease in fluid delivery, said pressure condition being caused by shifting said valve to a position in which it disconnects said pumping mechanism from said actuator, and a second pumping means adapted to deliver fluid to said actuator when said valve is positioned to disconnect said first pumping means from said actuator.

6. A hydraulic actuator system including a hydraulic actuator for shifting supporting parts and the like, a low pressure high displacement pumping mechanism for imparting rapid traverse to said actuator at maximum delivery, a valve for controlling the fluid flow between said pumping mechanism and said actuator, a variable speed electric motor for driving said pumping mechanism, and control means operable when the valve occupies a given position to effect an increase in the speed of said motor and operable in accordance with a pressure condition of said controlled fluid to effect a decrease in fluid delivery, said pressure condition being caused by shifting said valve to a position in which it disconnects said pumping mechanism from said actuator.

7. A hydraulic actuator system including a hydraulic actuator for shifting supporting parts and the like, a relatively large capacity pumping mechanism for imparting rapid traverse to said actuator at maximum delivery, a valve for controlling the fluid flow between said pumping mechanism and said actuator, driving means for said pumping mechanism, and means operable in instantaneous timed relation with the actuation of said valve and in accordance with a pressure condition of said controlled fluid for varying the rate of delivery of fluid from said large capacity pumping mechanism to said actuator, said pressure condition being caused by shifting said valve to a position in which it disconnects said pumping mechanism from said actuator.

8. A hydraulic actuator system including a hydraulic actuator for shifting supporting parts and the like, a low pressure high displacement pumping mechanism for imparting rapid traverse to said actuator at maximum delivery, said pumping mechanism including a valve shiftable for varying the displacement thereof, a second valve for contemporaneously controlling the opening and closing of communication of said pumping mechanism with both the intake and discharge sides of said actuator, driving means for said pumping mechanism, and means shiftable in timed relation with the actuation of said second valve for controlling the shifting of the first valve and thereby effecting a variation in displacement of said pumping mechanism.

9. A hydraulic actuator system including a hydraulic actuator for shifting supporting parts and the like, a gear pump for imparting rapid traverse to said actuator at various rates, a valve for controlling the fluid flow between said gear pump and said actuator to govern the direction of movement of said actuator, driving means for said pump, and control means operable upon the shifting of said valve and in accordance with a pressure condition of said controlled fluid for controlling the rate of delivery of said gear pump, said pressure condition being caused by shifting said valve to a position in which it disconnects said gear pump from said actuator.

10. A hydraulic actuator system including a hydraulic actuator for shifting supporting parts and the like, a variable delivery gear pump for imparting rapid traverse to said actuator at maximum delivery, a valve for controlling the fluid flow between said gear pump and said actuator to govern the direction of movement of said actuator, driving means for said pump, and control means operable upon the shifting of said valve and in accordance with a pressure condition of said controlled fluid for varying the rate of delivery of said gear pump, said pressure condition being caused by shifting said valve to a position in which it disconnects said pumping mechanism from said actuator.

11. A hydraulic actuator system including a hydraulic actuator for shifting machine parts and the like, said actuator including a cylinder having a piston therein, pumping means for propelling said actuator at a feeding rate, low pressure pumping means for propelling said actuator at a rapid rate, said low pressure pumping means being adapted to deliver fluid at various rates, one of said pumping means being operable independently of the other for effecting the relative propulsion of said piston and cylinder, and means operable in timed relation with respect to the shifting of said actuator for varying the rate of delivery of the low pressure pumping means.

12. A hydraulic actuator system including a hydraulic actuator for shifting machine parts and the like, said actuator including a cylinder having a piston therein, pumping means for propelling said actuator at a feeding rate, low pressure pumping means for propelling said actuator at a rapid rate, one of said pumping means being operable independently of the other for effecting the propulsion of said actuator, and means for decreasing the displacement of the low pressure pumping means during the operative functioning of the other pumping means and for increasing the displacement of said low pressure pumping means when the other pumping means is functionally inoperative.

13. A hydraulic actuator system including a hydraulic actuator for shifting machine parts and the like, said actuator including a cylinder having a piston therein, pumping means for propelling said actuator at a feeding rate, low pressure pumping means for propelling said actuator at a rapid rate, one of said pumping means being operable independently of the other for effecting the propulsion of said actuator, means for decreasing the displacement of the low pressure pumping means during the operative functioning of the other pumping means and for increasing the displacement of said low pressure pumping means when the other pumping means is functionally inoperative, and a valve mechanism for controlling the delivery of fluid from said low pressure pumping means to said actuator.

14. A hydraulic actuator system including a hydraulic actuator for shifting supporting parts and the like, said actuator including a cylinder having a piston therein, pumping means for propelling said actuator at a feeding rate, pumping means for propelling said actuator at a rapid rate, said first pumping means being functionally operable for propelling purposes independently of said second pumping means, a fluid reservoir directly connected with the intake of said second pumping means, a valve for controlling the fluid delivered by said second pumping means from said reservoir and for controlling the return of fluid to said reservoir, and a relief mechanism operable for permitting the return of fluid therethrough to the reservoir, said fluid being returned from the discharge side of said actuator at pressures developed in the return side of the system when the second pumping means is operatively functioning to receive fluid from said reservoir and deliver said fluid for propelling purposes to said actuator.

15. A hydraulic actuator system including a hydraulic actuator for shifting machine parts and the like, said actuator including a cylinder having a piston therein, pumping means for propelling said actuator at a feeding rate, pumping means for propelling said actuator at a rapid rate, a fluid reservoir directly connected with the intake of said second pumping means, a valve for controlling the fluid delivered by said second pumping means from said reservoir and for controlling the return of fluid to said reservoir, and a relief mechanism for permitting the return of fluid therethrough to the reservoir, said relief mechanism being non-responsive to pressures developed in the return side of the system during the operative functioning of the first pumping means, and responsive to pressures developed in the return side of the system when said second pumping means receives fluid from said reservoir and delivers said fluid for propelling purposes to said actuator.

16. A hydraulic actuator system including a hydraulic actuator for shifting machine parts and the like, said actuator including a cylinder having a piston therein, a plunger pump for propelling said actuator at a feeding rate, a second pump for propelling said actuator at a rapid rate, a fluid reservoir for supplying fluid directly to the intake side of said second pump, a shiftable control valve to govern the independent delivery of fluid from said pumps to said actuator, a channel for conducting return fluid from said valve to said reservoir, and a relief valve connected with said channel, said relief valve being functionally operative to permit the flow of fluid therethrough into said reservoir when said second pump receives fluid from said reservoir and delivers said fluid to said actuator and adapted to prevent said flow of fluid therethrough during the operative functioning of said plunger pump.

17. A hydraulic actuator system including a hydraulic actuator for shifting machine parts and the like, a feed pump for propelling said actuator at a feeding rate, a rapid traverse variable delivery pump, a valve mechanism for controlling delivery of fluid between said pumps and said actuator, and means operable in timed relation with the actuation of said valve for controlling the rate of delivery of said rapid traverse pump.

18. A hydraulic actuator system including a hydraulic actuator for shifting supporting parts and the like, a feed pump for propelling said actuator at a feeding rate, a rapid traverse pump adapted to deliver fluid at various rates and driven independently of said feed pump, a valve mechanism for controlling delivery of fluid between said pumps and said actuator, a variable speed drive for said rapid traverse pump, and means for controlling said drive to vary the delivery of the pump in accordance with the fluid capacity requirements of the system.

19. A hydraulic actuator system including a hydraulic actuator for shifting machine parts and the like, a relatively large capacity pumping mechanism for imparting rapid traverse to said actuator, a valve for controlling delivery of fluid between said pumping mechanism and said actuator and for governing the direction of travel of said actuator, and a second valve for automatically causing a decrease in the rate of fluid delivery to the actuator at a predetermined interval in the cycle of operation of said actuator.

20. A hydraulic actuator system including a hydraulic actuator for shifting machine parts and the like, a relatively large capacity pumping mechanism for imparting rapid traverse to said actuator, a valve for controlling delivery of fluid between said pumping mechanism and said actuator and for governing the direction of travel of said actuator, and a second valve means which is adapted in one shifted position to enable fluid to be delivered to the actuator at a given rate and in another position to automatically effect a variation in the rate of fluid delivery to said actuator at a predetermined interval in the cycle of operation of said actuator.

21. A hydraulic actuator system including a hydraulic actuator for shifting machine parts and the like, a relatively large capacity pumping mechanism for imparting rapid traverse to said actuator, a valve for controlling delivery of fluid between said pumping mechanism and said actuator and for governing the direction of travel of said actuator, and a second valve means which is operable in timed relation with the actuation of the first valve and adapted in one shifted position to enable fluid to be delivered to the actuator at a given rate and in another position to effect a variation in the rate of fluid delivery to said actuator.

ERNEST J. SVENSON.